United States Patent [19]

Standley

[11] Patent Number: 5,067,058
[45] Date of Patent: Nov. 19, 1991

[54] SKATEBOARD HAVING LIGHTING SYSTEM

[76] Inventor: Michael P. Standley, 5785 W. Rochelle Ave., Apt. 206, Las Vegas, Nev. 89103

[21] Appl. No.: 501,280

[22] Filed: Mar. 28, 1990

Related U.S. Application Data

[63] Continuation-in-part of Ser. No. 335,991, Jul. 31, 1989, abandoned.

[51] Int. Cl.$^5$ .............. B60Q 1/26; B62M 1/00; G02B 5/12
[52] U.S. Cl. .................. 362/83.3; 362/61; 362/190; 362/191; 362/206; 280/87.042; 359/515; 180/181
[58] Field of Search .............. 350/97, 100, 104; 180/180, 181; 272/70, 70.1, 70.2; 280/11.19, 11.25, 841, 843, 87.042; 301/5.3; 362/78, 103, 61, 83.3, 184, 190, 191, 206

[56] References Cited

U.S. PATENT DOCUMENTS

| | | | |
|---|---|---|---|
| 2,140,224 | 12/1938 | Galgoczy | 362/103 |
| 2,502,566 | 4/1950 | Hooley | 362/103 |
| 2,505,154 | 4/1950 | Smith | 362/103 |
| 3,008,038 | 11/1961 | Dickens et al. | 362/103 |
| 3,023,022 | 2/1962 | Boyden | 280/87.04 |
| 3,789,208 | 1/1974 | Lewis | 362/103 |
| 3,946,505 | 3/1976 | Dana, III | 362/103 |
| 3,954,279 | 5/1976 | Guerr | 280/87.04 |
| 4,127,348 | 11/1978 | Roberts | 494/16 |
| 4,143,728 | 3/1979 | Shiber | 180/181 |
| 4,240,132 | 12/1980 | Wickman | 362/103 |
| 4,298,910 | 11/1981 | Price | 362/103 |
| 4,307,788 | 12/1981 | Shelton | 180/181 |
| 4,336,573 | 6/1982 | Carter | 362/78 |
| 4,367,515 | 1/1983 | Beard | 362/103 |
| 4,394,037 | 7/1983 | Kuntz | 280/816 |
| 4,463,412 | 7/1984 | Broach | 362/103 |
| 4,817,974 | 4/1989 | Bergeron | 280/11.2 |

*Primary Examiner*—Loha Ben
*Attorney, Agent, or Firm*—Quirk, Tratos & Roethel

[57] ABSTRACT

An improved skateboard having roller trucks attached to the underside of the skateboard deck. The trucks are insulated from the skateboard deck by riser pads of sufficient thickness to receive and house self-contained battery operated lamps. The lamps are positioned to direct light beams from beneath the deck in fore and aft directions. Switch means in the lamps are operable to turn the lamps on and off.

10 Claims, 3 Drawing Sheets

SKATEBOARD HAVING LIGHTING SYSTEM

This is a continuation in-part of co-pending application Ser. No. 07/335,991, filed Jul. 31, 1989, now abandoned.

BACKGROUND OF THE INVENTION

This invention relates generally to skateboards and more particularly to an improved skateboard lighting system to provide safety illumination for the skateboard user when riding the skateboard under adverse lighting conditions.

Skateboards having lighting systems mounted thereon are known in the prior art as exemplified by U.S. Pat. No. 4,817,974 issued to R. L. Bergeron. This patent discloses a skateboard having upwardly exposed forward and rearward light brackets releasably attached to the skateboard nose and tail.

It is an object of the present invention to provide a lighting system in which the lamps are located beneath the deck of the skateboard and are protected against dislodgement or damage during rough usage.

It is a further object of the invention to utilize commercially available flashlight-type lamps that have a shock resistant case, are water resistant, use long-life bulbs and require minimal space requirements.

It is yet a further object to house the lamps in the riser pads that insulate the wheel trucks from the underside of the skateboard deck and require only a minimal increase in the thickness of the riser pad to accommodate the lamp.

These and other objects of the invention will be apparent from the following disclosure of the preferred embodiment of the present invention.

SUMMARY OF THE INVENTION

A skateboard having adjacent one of its ends a roller truck attached to the underside of the skateboard deck, the truck being insulated from the skateboard deck by a riser pad. A self-contained battery operated lamp is housed in the riser pad with the lamp being positioned to direct its light beam from beneath the deck beyond the one end thereof. The riser pad has an access opening for turning the lamp on and off by rotating a body part of the lamp to actuate a rotary switch.

BRIEF DESCRIPTION OF THE DRAWINGS

This invention is best understood with reference to the drawings, in which.

DETAILED DESCRIPTION OF THE PREFERRED EMBODIMENT

Figure 1:
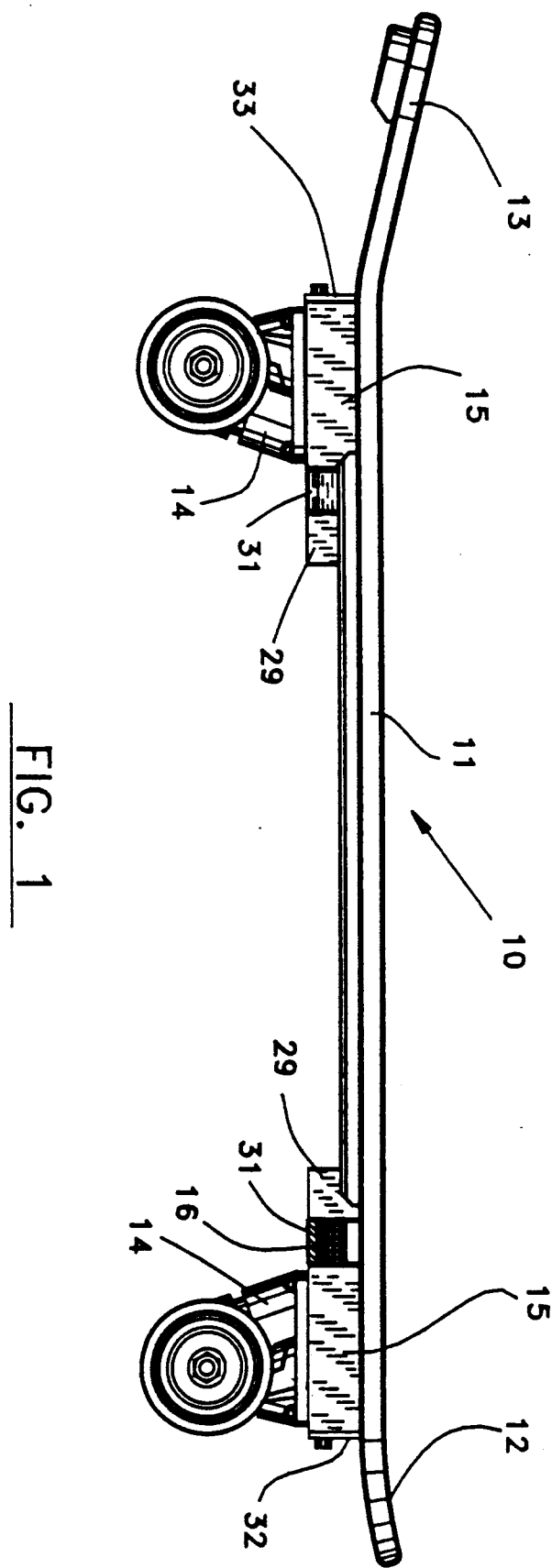
FIG. 1 is a side elevation of a skateboard embodying the present invention.
Figure 2:
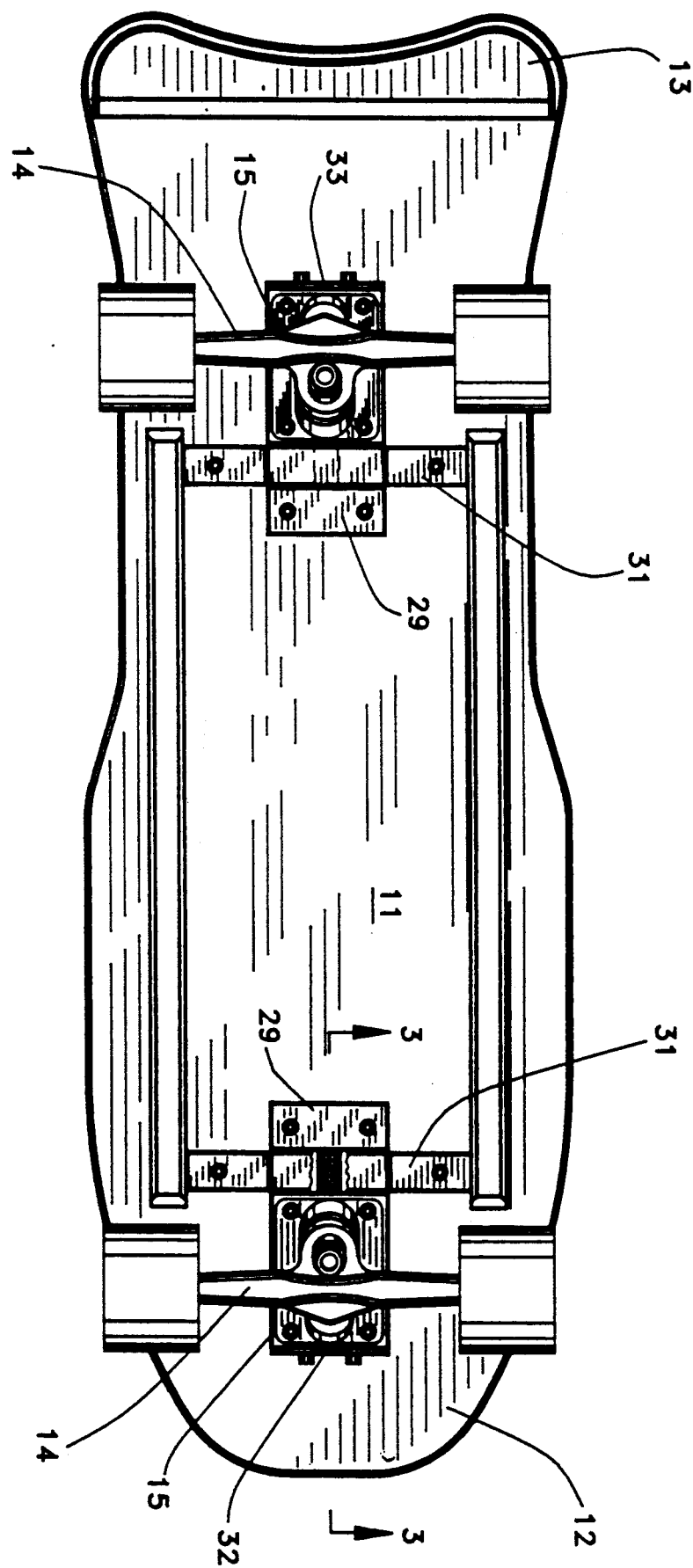
FIG. 2 is a bottom view of the skateboard.

Referring first to FIG. 1, there is shown a skateboard, generally designated 10, having the conventional skateboard features of a deck 11, a nose 12, a tail 13 and wheel trucks 14. In the conventional skateboard the wheel trucks are insulated from the underside of the deck 11 by rectangular polypropylene riser pads about one-quarter of an inch thick. A distinguishing feature of the skateboard 10 embodying the present invention is that the riser 15 pads are about four times as thick.

Figure 3:
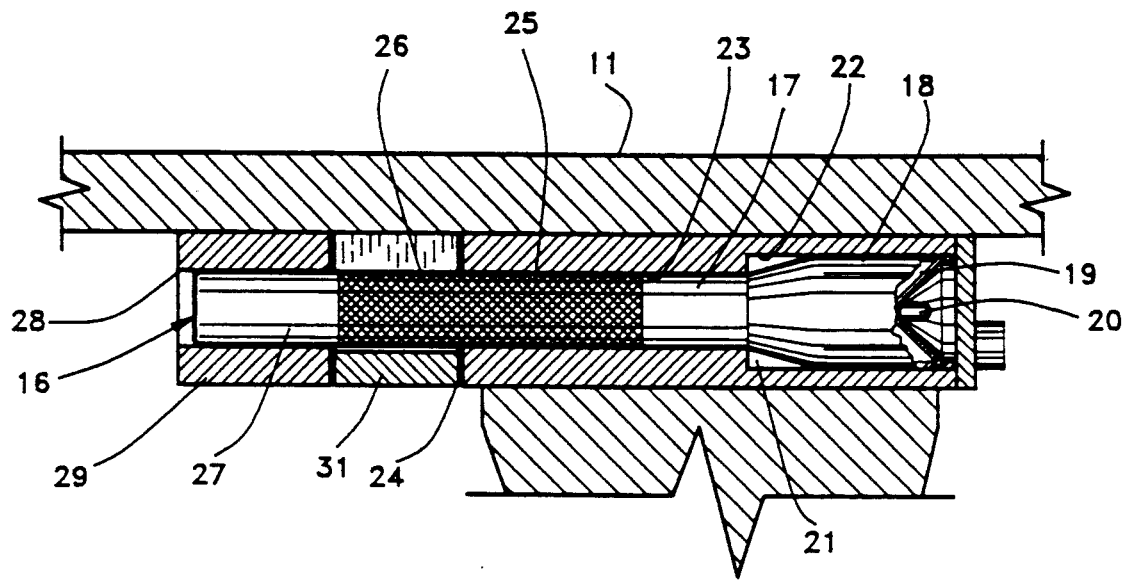
FIG. 3 is an enlarged partial section view taken on the line 3—3 of FIG. 2 showing the lamp as encased in a skateboard riser pad.
Figure 4:
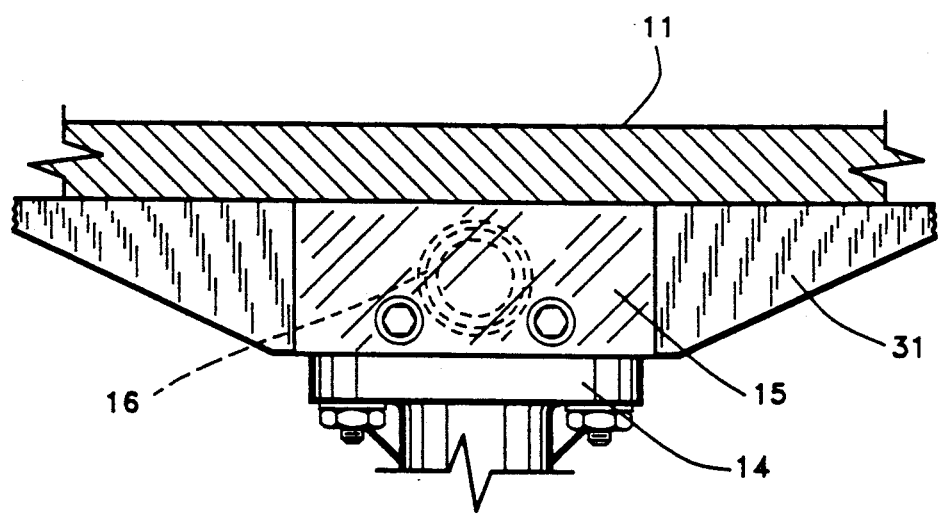
FIG. 4 is a front view in part sectional of FIG. 3.

As best seen in FIGS. 3 and 4, the extra thickness of the riser pads 15 is required so that the riser pads may be utilized to provide housings for lamps, generally designated 16. Each lamp 16 is preferably a self-contained flashlight-type lamp that has a shock resistant case, is water resistant, uses long-life bulbs and requires minimal space requirements. Such a lamp is currently commercially available under the trade name Mini-Maglite.

The lamp 16 selected for each riser pad 15 of a thirty-inch long and ten inch wide skateboard has the following dimensions: The casing of each lamp 16 has an overall length of five inches and has a main cylindrical body section 17 that is three and five-eights inches long and is approximately one-half inch in diameter. The body section 17 houses the batteries (not shown). At its head end 18 the lamp casing is enlarged to a diameter of three-fourths of an inch and houses the reflector 19 and lamp bulb 20.

As best seen in FIG. 3, each riser pad 15 has a stepped bore 21 having a section 22 to accommodate the head end 18 of the lamp 16 and a section 23 to accommodate the cylindrical body section 17 of the lamp. Each lamp 16 is inserted into the riser bore 21 through the enlarged bore section 22. When the head end 18 of the lamp 16 is fully seated in the bore section 22, the cylindrical body section of he lamp 16 will extend beyond the end 24 of the riser pad 15.

The exterior surface 25 of the lamp 16 has a knurled midsection 26 that extends a substantial distance beyond the end 24 of the riser pad 15. Beyond the knurled midsection the end 27 of the cylindrical section 17 is supported in a bore 28 in a polypropylene block 29 spaced from the end 24 of the riser pad 15. The space between the riser block 15 and the block 29 provides access to the knurled midsection 26 of the lamp body whereby the latter may be rotated in "on" or "off" directions to turn the lamps on or off. The lamps 16 each contain a rotary switch (not shown) that is actuated by rotating the cylindrical body portion 17 relative to the head end 18 of the lamp. Rotation of the cylindrical body portion beyond the lamp on position permits adjustment of the lamp beam from a spot beam to a flood beam. Such rotation of the cylindrical body portion results in slight variation of the length of the lamp 16 the end of which is free to move in and out slightly with respect to the bore in the block 29.

With each lamp 16 protectively mounted in a riser pad 15, each lamp is positioned to direct a light beam from beneath the skateboard deck beyond the adjacent end thereof.

A protective readily removable bridge piece 31 is fitted into the space between the block 29 and the end 24 of the riser pad 15 to protect the otherwise exposed cylindrical body section 17 of the lamp 16.

At the nose end 12 of the skateboard a clear plastic plate 32 is bolted in place over the front end of the front riser to protect the lamp bulb 10 when it functions as the skateboard headlight. At the tail end 13 of the skateboard, a red acrylic plate 33 is similarly bolted to the rear end of the rear riser pad 15 to cover the bulb 10 of the rear lamp 16. The rear lamp 16 functions as the skateboard taillight.

While the invention has been illustrated with respect to a specific embodiment thereof, this embodiment should be considered as illustrative rather than limiting. Various modifications and additions may be made and will be apparent to those skilled in the art. Accordingly, the invention should not be limited by the foregoing description, but rather should be defined only by the following claims.

What is claimed is:

1. An improved skateboard having adjacent one of its ends a roller truck attached to the underside of a skateboard deck, the truck being insulated from the skateboard deck by a riser pad, wherein the improvement comprises:

a self-contained battery operated lamp housed in the riser pad, the lamp having a cylindrical body forming a battery compartment that is expanded at one end to form a bulb containing compartment, the riser pad having a stepped bore that is complementary to the shape of the lamp and contains the lamp therein, the lamp being positioned to direct a light beam emanated therefrom from beneath the deck beyond the one end thereof, and switch means for turning the lamp on and off.

2. An improved skate board according to claim 1, in which:

the lamp is turned on or off by rotating its battery compartment relative to the bulb compartment to actuate a rotary switch contained in the lamp, and the riser pad has an opening providing access to the lamp for rotating the battery compartment.

3. An improved skateboard according to claim 1, in which:

the lamp comprises a miniature flashlight having a cylindrical body portion containing a battery and an enlarged head portion containing a reflector and a bulb, and the riser pad has an elongated bore therethrough having a diameter sized to accommodate the cylindrical body portion of the flashlight and a shorter enlarged opening leading into the elongated bore sized to accommodate the enlarged head portion of the flashlight.

4. An improved skateboard according to claim 3, in which:

the miniature flashlight is of the type in which the light bulb is energized or de-energized by rotation of the cylindrical body portion containing the battery relative to the enlarged head portion containing the bulb to cause an internal switching means to be turned on or off.

5. An improved skateboard according to claim 4, in which:

the front face of the flashlight lies flush with a face of the riser pad in which the lamp is housed, and the reflector and the bulb are protected by a translucent cover plate.

6. An improved skateboard having a skateboard deck having a front end and a rear end, a roller truck attached to the underside of the skateboard deck adjacent each of its ends, the trucks being insulated from the skateboard deck by riser pads, wherein the improvement comprises:

a self-contained battery operated lamp housed in each of the riser pads, each of the lamps being positioned to direct a light beam emanated therefrom from beneath the skateboard deck beyond an adjacent end thereof, each lamp having a cylindrical body forming a battery that is expanded at one end to form a bulb containing compartment, each riser pad having a stepped bore that is complementary to the shape of the lamp that is contained therein, and the riser pads each having an access opening to the lamps for turning the lamps on or off.

7. An improved skateboard according to claim 6, in which:

each lamp is turned on or off by rotating its battery compartment relative to the bulb compartment to actuate a switch contained in the lamp.

8. A skateboard having at its front end and its rear end a roller truck attached to the underside of a skateboard deck, each truck having interposed between it and the deck a polypropylene riser pad, a headlight housed in the front riser pad for directing a light beam emanated therefrom forwardly of the front truck from beneath the front end of the skateboard deck, a taillight housed in the rear riser pad for directing a light beam emanated therefrom rearwardly of the rear truck from beneath the rear end of the skateboard deck, the headlight and the taillight each comprise a miniature flashlight having a cylindrical body containing a battery and an enlarged head portion containing a lens and a light bulb, each riser pad has an elongated bore therethrough of a diameter sized to accommodate the cylindrical body of the flashlight and a shorter enlarged opening leading into the elongated bore sized to accommodate the enlarged head portion of the flashlight, and each riser pad having an opening providing access to the headlight and the taillight housed therein for actuating the same.

9. A skateboard according to claim 8, in which:

the miniature flashlights used for the headlight and the taillight are of the type in which light bulbs are energized or de-energized by rotating the cylindrical body containing the batteries relative to the enlarged head portion thereby causing an internal switching means to be turned on or off.

10. A skateboard according to claim 9, in which:

a front end of the flashlight lies flush with a face of the riser pad in which the headlight or the taillight is housed, and the lens and the bulb of the headlight are protected by a clear plastic cover plate and of the taillight by a red acrylic cover plate, and the cover plates are secured to respective adjacent riser pad faces.

* * * * *